United States Patent [19] Winandy et al.

[11] 3,916,389
[45] Oct. 28, 1975

[54] COMMUNICATION SWITCHING SYSTEM DATA REFORMATTING ARRANGEMENT

[75] Inventors: Martin R. Winandy, La Grange, Ill.; Bryan F. Gearing, Bedford, Mass.

[73] Assignee: GTE Automatic Electric Laboratories Incorporated, Northlake, Ill.

[22] Filed: Jan. 18, 1974

[21] Appl. No.: 434,704

[52] U.S. Cl. .............................................. 340/172.5
[51] Int. Cl.$^2$ ........................................... G06F 1/00
[58] Field of Search...... 340/172.5; 179/7 MM, 8 R, 179/18 EB, 18 ES, 2 DP; 360/39

[56] References Cited

UNITED STATES PATENTS

| | | | |
|---|---|---|---|
| 3,737,873 | 6/1973 | Puccini | 179/18 EB |
| 3,760,364 | 9/1973 | Yamauchi | 340/172.5 |
| 3,764,987 | 10/1973 | Schultz | 340/172.5 |

*Primary Examiner*—Ralph D. Blakeslee

[57] ABSTRACT

A data reformatting arrangement as used in the disclosed communication switching system reformats a system data word (which may be 24-bit ticketing information, program coded information or the like) for supplying it to recording apparatus, includes an output register for transferring portions of the word to the recording apparatus, a first gating circuit for transferring sequentially N number (such as 3) of portions of the formatted word to the output register for reformatting the data word for the recording apparatus, and a second gating circuit for transferring sequentially M number (such as 6) of portions of the formatted word to the output register for reformatting the data word for the recording apparatus for conveying the thus reformatted word to the recording apparatus. A byte allotter controls the first and second gates for selecting the number of bytes, whether M or N number of bytes.

5 Claims, 3 Drawing Figures

COMMUNICATION SWITCHING SYSTEM DATA REFORMATTING ARRANGEMENT

BACKGROUND OF THE INVENTION

1. Field of the Invention

The present invention relates to a word reformatting arrangement, and it more particularly relates to a word reformatting arrangement which may be used in a communication switching system for reformatting system data words for supplying them to a recording apparatus, such as a magnetic tape recorder.

2. Description of the Prior Art

Communication switching systems, such as electronic stored-program telephone systems, have employed magnetic tape recording apparatus for storing system information, such as toll ticketing information. Such an arrangement is satisfactory for some applications; however, in order to utilize the ticketing magnetic tape recording apparatus for the additional function of retrieving system program information, it would be highly desirable to have a separate word format or bit arrangement for the two different modes of operation — writing toll ticketing information and writing program information. In this regard, the system information to be stored on the tape must be reformatted or restructured to be arranged in a suitable form to be received by the magnetic tape. For example, in the case where the system word is larger than the recorded word, portions of bytes of the system word are transferred sequentially to the magnetic tape. In the case of writing program information in the machine language onto tape, alpha-numeric codes are required to be transferred to the tape and in the case of ticketing information, numeric code is required. A different procedure for writing the numeric code would enable the system computer processor to operate more efficiently, since such a code is less complicated than an alphanumeric code.

SUMMARY OF THE INVENTION

The principal object of the present invention is to provide a new and improved word reformatting arrangement, which facilitates the arrangement of information words. Another object of the present invention is to provide such a word reformatting arrangement, which enables a stored-program communication switching system to write ticketing information and program information in two different modes of operation to utilize the system computer in an efficient and economical manner.

CROSS-REFERENCES TO RELATED APPLICATIONS AND PATENTS

The preferred embodiment of the invention is incorporated in a COMMUNICATION SWITCHING SYSTEM WITH MARKER, REGISTER AND OTHER SUBSYSTEMS COORDINATED BY A STORED PROGRAM CENTRAL PROCESSOR, U.S. Pat. application Ser. No. 342,323, filed Mar. 19, 1973 now U.S. Pat. No. 3,835,260 issued Sept. 10, 1974, hereinafter referred to as the SYSTEM application. The system may also be referred to as No. 1 EAX or simply EAX.

The memory access, and the priority and interrupt circuits for the register-sender subsystem are covered by U.S. Pat. No. 3,729,715 issued Apr. 24, 1973 by C. K. Buedel for a MEMORY ACCESS APPARATUS PROVIDING CYCLIC SEQUENTIAL ACCESS BY A REGISTER SUBSYSTEM AND RANDOM ACCESS BY A MAIN PROCESSOR IN A COMMUNICATION SWITCHING SYSTEM, hereinafter referred to as the REGISTER-SENDER MEMORY CONTROL patent.

The register-sender subsystem is described in U.S. Pat. No. 3,737,873 issued June 5, 1973 by S. E. Puccini for DATA PROCESSOR WITH CYCLIC SEQUENTIAL ACCESS TO MULTIPLEXED LOGIC AND MEMORY, hereinafter referred to as the REGISTER-SENDER patent.

The marker for the system is disclosed in the U.S. Pat. No. 3,681,537, issued Aug. 1, 1972 by J. W. Eddy, H. G. Fitch, W. F. Mui and A. M. Valente for a MARKER FOR COMMUNICATION SWITCHING SYSTEM, and U.S. Pat. No. 3,678,208, issued July 18, 1972 by J. W. Eddy for a MARKER PATH FINDING ARRANGEMENT INCLUDING IMMEDIATE RING; and also in U.S. Pat. applications Ser. No. 281,586 filed Aug. 17,1972 now U.S. Pat. No. 3,806,659 issued Apr. 23, 1974 by J. W. Eddy for an INTERLOCK ARRANGEMENT FOR A COMMUNICATION SWITCHING SYSTEM, Ser. No. 311,606 filed Dec. 4, 1972 now U.S. Pat. No, 3,830,983 issued Aug. 20, 1974 by J. W. Eddy and S. E. Puccini for a COMMUNICATION SYSTEM CONTROL TRANSFER ARRANGEMENT, Ser. No. 303,157 filed Nov. 2, 1972 now U.S. Pat. No. 3,809,822 issued May 7, 1974 by J. W. Eddy and S. E. Puccini for a COMMUNICATION SWITCHING SYSTEM INTERLOCK ARRANGEMENT, hereinafter referred to as the MARKER patents and applications.

The communication register and the marker transceivers are described in U.S. Pat. application Ser. No. 320,412 filed Jan. 2, 1973 now U.S. Pat. No. 3,814,859 issued June 4, 1974 by J. J. Vrba and C. K. Buedel for a COMMUNICATION SWITCHING SYSTEM TRANSCEIVER ARRANGEMENT FOR SERIAL TRANSMISSION, hereinafter referred to as the COMMUNICATIONS REGISTER patent application.

The executive or operating system of the stored program processor is disclosed in U.S. Pat. application Ser. No. 347,281 filed Apr. 2, 1973 by C. A. Kalat, E. F. Wodka, A. W. Clay, and P. R. Harrington for STORED PROGRAM CONTROL IN A COMMUNICATION SWITCHING SYSTEM, hereinafter referred to as the EXECUTIVE patent application.

The computer line processor is disclosed in U.S. patent application Ser. No. 347,966 filed Apr. 4, 1973 now U.S. Pat. No. 3,831,151 issued Aug. 20, 1974 by L. V. Jones and P. A. Zelinski for a SENSE LINE PROCESSOR WITH PRIORITY INTERRUPT ARRANGEMENT FOR DATA PROCESSING SYSTEMS.

Programs for communication between the data processing unit and the register-sender, in addition the the SYSTEM application, are disclosed in U.S. Pat. application S. N. 358,753 filed May 9, 1973 now U.S. Pat. No. 3,819,865 issued June 24, 1974 by F. A. Weber et al.

The scanner for the local automatic message accounting subsystem is disclosed in patent application Ser. No. 434,743, filed Jan. 18, 1974 by B. F. Gearing, M. R. Winandy, G. Grzybowski and D. F. Gaon; and in two articles in the GTE Automatic Electric Technical Journal, Vol. 13, No. 4 (October, 1972) at pages 177–184 and pages 185–196.

The magnetic tape unit of the local automatic message accounting subsystem is disclosed in patent application Ser. No. 434,742, filed Jan. 18, 1974 by B. F. Gearing et al.

The above patents, patent applications, and articles are incorporated herein and made a part hereof as though fully set forth.

DESCRIPTION OF A PREFERRED EMBODIMENT

Figure 1:
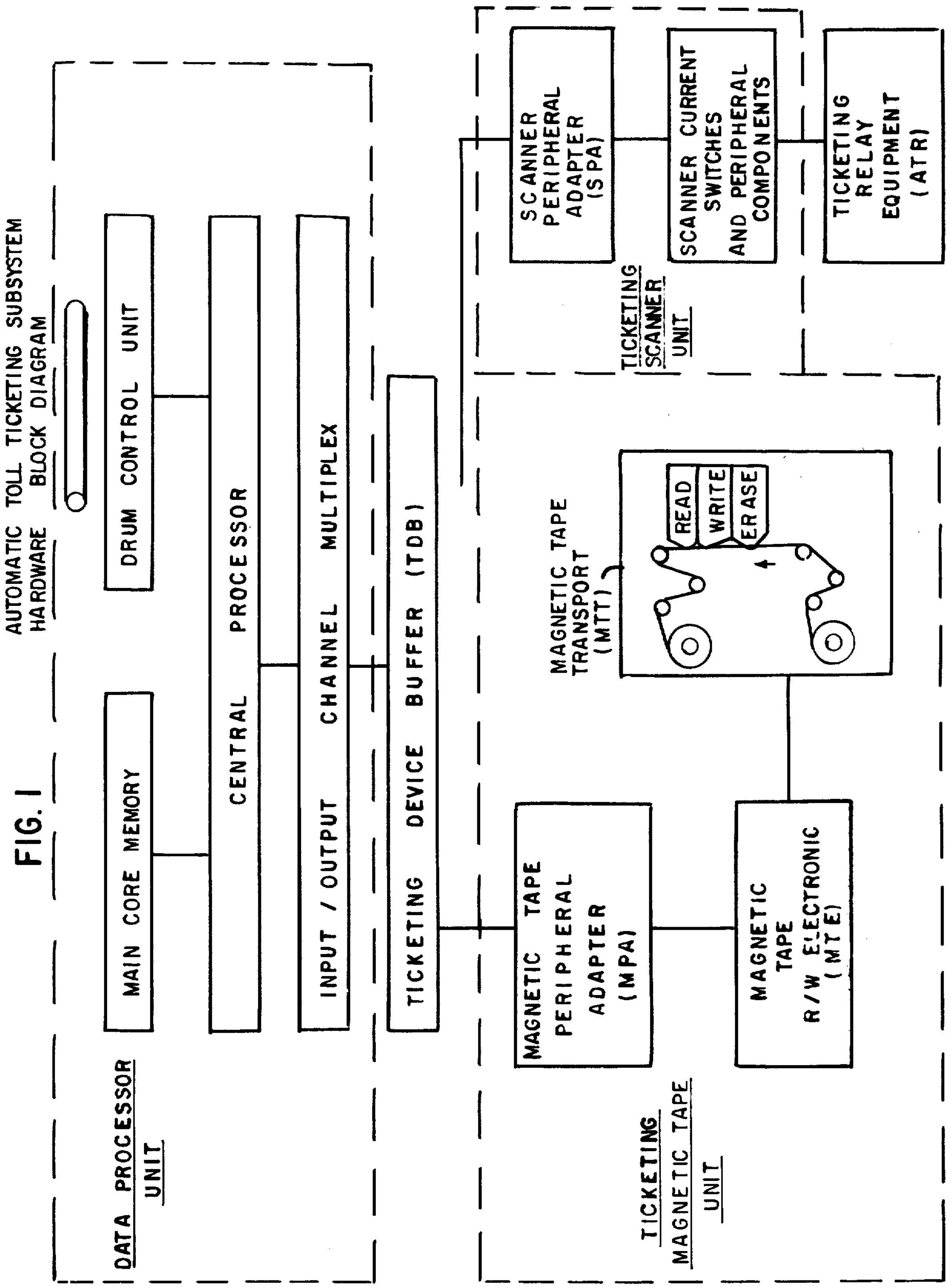
FIG. 1 is a block diagram of a ticketing magnetic tape unit incorporating the word reformatting arrangement of the present invention, the diagram illustrating the data processor unit portion of a communication switching system in which the magnetic tape unit is employed.

Referring now to FIG. 1, there is shown a ticketing magnetic tape unit, which is adapted to be used in a communication switching system (not shown) to provide a temporary record of individual toll call data for future processing and subscriber billing. Provisions are also made for the recording of data for non-billing purposes such as division of revenue and toll traffic studies. The ticketing relay equipment contains the scanpoint devices to be monitored by the ticketing scanner. The ticketing scanner unit is a medium speed electronic scanner/multiplex device. The scanner unit interrogates contacts associated with the system supervisory circuits, such as originating junctors, outgoing trunks, and incoming trunks. The scanner operation is controlled by the scanner peripheral adapter (SPA). One of N check is provided on instruction decode and a full word of status bits is accessible by a select instruction (100) from the central processor. The ticketing magnetic tape unit consists of the magnetic tape transport and its associated read/write electronics, data buffering, error detection, and tape drive control electronics. The magnetic tape transport (MTT) write/read head assembly writes data on nine tracks in a continuous non-return to zero change at one (NRZ1) mode at 800 characters per inch. The tape used is standard width (half-inch) computer tape. The magnetic tape R/W electronics (MTE) circuit provides the timing and necessary discrete component and analogue interface to the magnetic tape transport. The MTE unit contains the erase, write, and read amplifiers, which supply current to the erase, write, and read heads in the magnetic tape transport. The write and read clocks are provided for writing and derived from the read head output for the reading operation. Other timers and a register that accumulates bits as they are read is also provided. The peripheral adapter receives data in four word groups from the central processor. The peripheral adapter's purpose is to interpret instructions received from the central processor via the ticketing device buffer into a sequence of events which will perform the required function. The data words are reorganized into characters (bytes), for output to the write amplifiers in the magnetic tape electronic circuit which feed the write heads on the transport illustrated in FIG. 2. There is a full word of status bits accessible by a select instruction from the central processor. The ticketing device buffer (TDB) provides the input/output interface to the computer complex for serving one of four peripheral adapters at a time. It is equipped in duplicate, each unit serving one scanner and one magnetic tape unit. In normal operation, one ticketing device buffer is used to service the input/output operation to the scanner unit and the other ticketing TDB services the magnetic tape unit. This arrangement is switched on alternate days. The ticketing device buffer provides intermediate reception and storage of instruction and data information from the central processor to a peripheral adapter. For communication from a peripheral adapter to the central processor the same storage is used for data type information and two interrupts (ready and error) are provided. It also provides checking facilities in the form of a parity check on a computer word and a 1 of N check on instructions.

Figure 2:
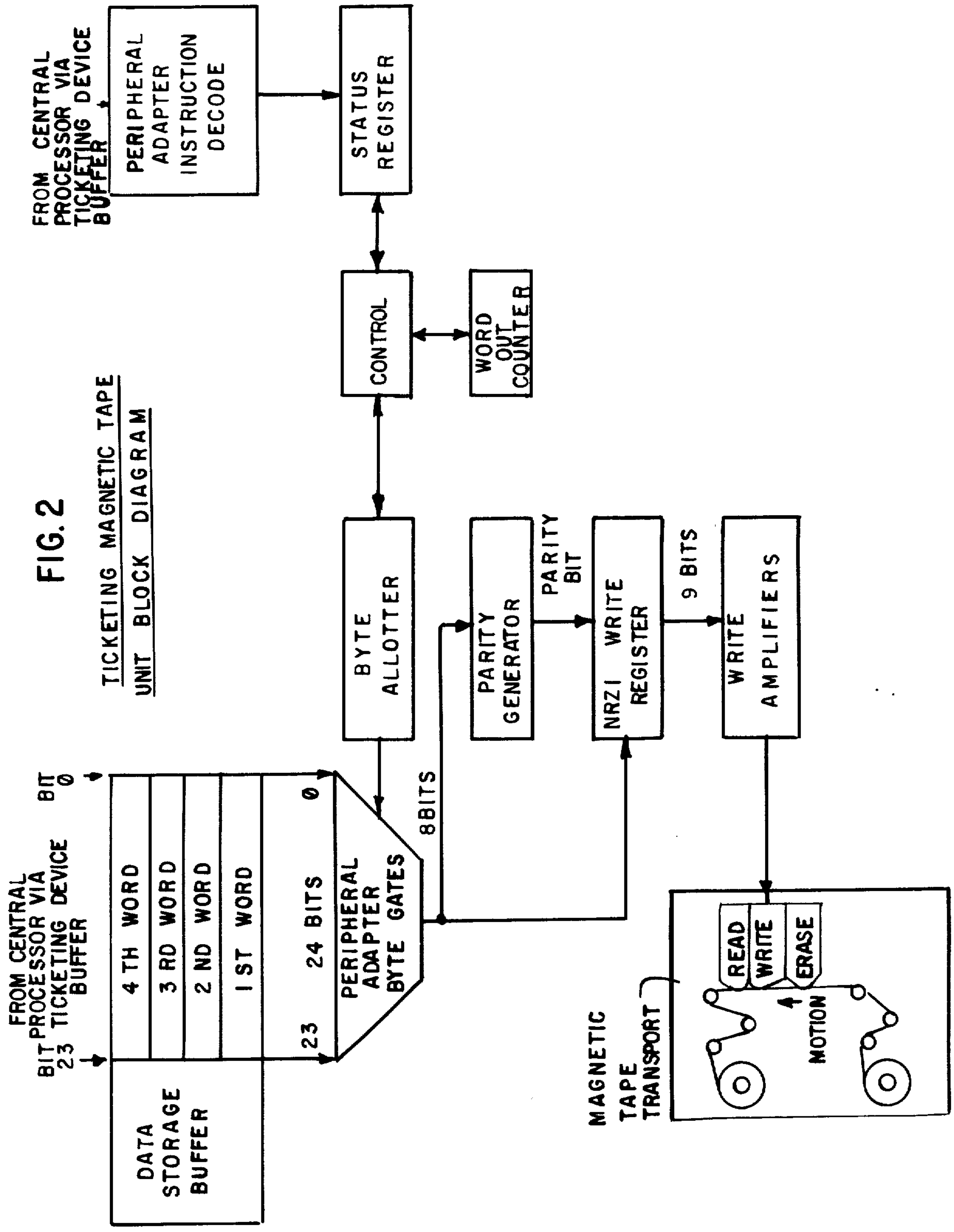
FIG. 2 is a block diagram of the ticketing magnetic tape unit of FIG. 1.

The ticketing magnetic tape unit block diagram shown in FIG. 2 contains the magnetic tape transport, which is divided into four functions: the tape drive system controls the movement of tape across the heads, the reel drive system controls tape feed and tape up, providing a fast wind capability, the magnetic head subasseembly contains read, write and erase heads, end of tape and beginning of tape sensors and a tape cleaner, and lastly the control subsystem to provide for local or remote control of the transport. The magnetic tape transport is controlled in the writing mode of operation by the magnetic tape electronics write amplifiers, which supply write current to the transport write heads. The data is fed to the write amplifiers by the non-return to zero change at one (NRZ1) register. The magnetic tape is processed for subscriber billing at data processing centers utilizing IBM machines. For this reason NRZ1 recording on magnetic tape is utilized with strict requirements on bits to track positioning. In NRZ1 recording, the intelligence on the tape is the change of flux, not necessarily the polarity of the flux. Initially, the tape is polarized in one direction; the erase head polarity determines the direction of flux. The NRZ1 register combines the eight data bits with a parity bit from the parity generator circuit. The eight data bits are also fed into the parity circuit so that even parity can be determined and recorded on the ninth bit. The byte gates restructure the computer words into tape bytes of either 3 or 6 bytes per computer word. The gating required to control the flow of data bits to the magnetic tape NRZ1 register allows eight data bits at a time to enter the NRZ1 register in the 3 byte write mode, or four data bits at a time with the remaining four data bits set to a byte fill character (1111), in the 6 byte write mode. The byte gates obtain the computer word from the data storage buffer, which stores four computer words at a time. This four word capability reduces the central processor real time that is required by the magnetic tape unit and provides more time for the system central processor to service other requests in the system. The byte allotter is supplied with the 3 or 6 byte write mode of operation information from the status register and controls which bits and the order of the bits to be removed from the storage buffer by the byte gates. The allotter also signals the word out counter whenever a complete word has been transferred from the data storage buffer to the byte gates for writing on magnetic tape. The word out counter records each computer word as it is removed from the data storage buffer. After three words have been removed the word out counter informs the central processor CCP of the unit DPU through the ticketing device buffer that the magnetic tape unit is ready to receive four more computer words to be written on tape. The status register stores operating mode and error indicators for the magnetic tape unit. The register receives its directives from the central processor through the peripheral adapter instruction decode circuit. The decoded instructions control both the operating mode and the functional operation of the magnetic tape unit.

Figure 3:
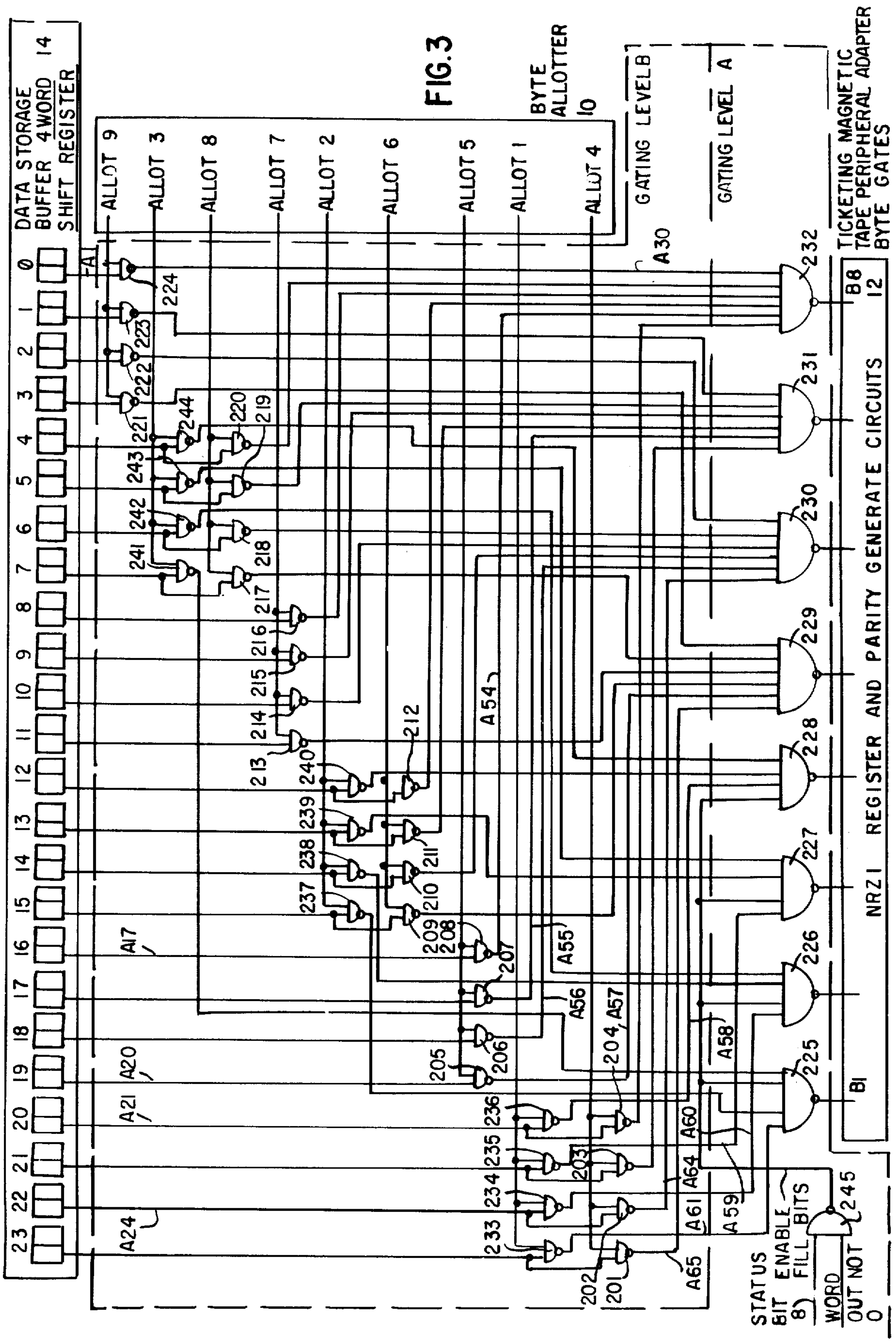
FIG. 3 is a symbolic block diagram of a portion of the ticketing magnetic tape unit of FIG. 1, showing the reformatting arrangement of the present invention.

Referring now to FIG. 3 in greater detail, the NRZ1 register 12, as previously disclosed, controls eight data bits and one parity bit to be written on the magnetic tape from the byte gate circuit, which consists of gating level B to control eight gates, 225 through 232 for loading the NRZ1 register and a logic control gate, 245, to enable fill bits for the six byte mode of operation with the data bits being switched from gating level A, which consists of nine groups of four gates, each group being controlled from the byte allotter 10, which enables one or two groups of level A gates to be opened for loading either four or eight data bits from the data storage buffer 14. Briefly, in operation the byte alloter, which controls the sending of data to the tape transport, is supplied with sufficient mode information from the system central processor for the purpose of determining whether four bit or eight bit characters are to be written on the magnetic tape. When the 3 byte mode of operation is required, the byte allotter enables the allot 1, 5, 2, 7, 3, and 9 leads two at a time, to open gating level A gates 233 through 236, 235 through 208, 237 through 240, 213 through 216, 141 through 244, and 221 through 224 to switch the data storage buffer 14 computer word, bits 0 through 23, to gating level B gates 225 through 232 for transfer to the NRZ1 register and parity generate circuits 12 to be written on magnetic tape. The second, third, and fourth computer words are written in a similar manner until the last word of the data block has been received from the central processor and written on magnetic tape. In the 6 byte mode of operation, the byte allotter enables allot leads 4, 5, 6, 7, 8, and 9, one at a time, to open gating level A gates 201 through 224 to switch the data storage buffer 14 computer word, bits 0 through 23, to gating level B gates 229 through 232, while gates 225 through 228 are loaded with byte fill characters from gate 245 for transfer to the NRZ1 register and parity generate circuits 12 to be written on magnetic tape. The remaining process is the same as disclosed in the 3 byte mode of operation.

The OR gate 225 has its output lead B1 connected to the first position of the NRZ1 register and has one of its inputs connected to the output of the AND gate 245, the other inputs being connected to the outputs of gates 233, 237, and 241 for loading bits 23, 15, and 7 of the data storage buffer 14 in the 3 byte mode of operation. Gates 226, 227, and 228 are connected in a similar manner as gate 225. The OR gate 229 has its output lead B5 connected to the fifth position of the NRZ1 register and has its outputs connected to gates 201, 209, and 217 for the 6 byte mode of operation, and the remaining outputs are connected to gates 205, 213, and 221 for both the 3 and 6 byte modes of operation. Gate 229 allows bits 23, 15, and 7 of the data storage buffer 14 to be loaded into the NRZ1 register during the 6 byte mode of operation, while also allowing bits 19, 11, and 3 of the data storage buffer 14 to be loaded into the NRZ1 register during both the 3 and 6 byte modes of operation. Gates 230, 231, and 232 are connected in a similar manner as gate 229.

The AND gate 233 has its output connected to an input of gate 225 for loading the first position in the NRZ1 register and has one of its inputs connected to the allot 1 signal from the byte allotter circuit 10, and the other input is connected to the output of the 23rd position in the data storage buffer shift register 14 through lead A24. The AND gates 234, 235, and 236 have their outputs connected in a similar manner as gate 233, but they are connected to an input of gates 226, 227, and 228 respectively for loading the NRZ1 register and each has one of its inputs also connected together and then to the allot 1 signal from the byte allotter 10, and the other input of each is connected to the output of the 22nd, 21st, and 20th positions respectively, of the data storage buffer 14 through leads A23, A22, and A21. Gates 233 through 236 are controlled by the byte allotter 10 in the 3 byte mode of operation. Similarly, AND gates 205 through 206, 237 through 240, 213 through 216, 241 through 244, and 221 through 224 are controlled by the byte allotter 10 from leads allot 5, allot 2, allot 7, allot 3, and allot 9 respectively to load the NRZ1 register with the 24 bits stored in the data storage buffer in the 3 byte mode of operation. The AND gate 201 has its output connected to the input of gate 229 for loading the fifth position in the NRZ1 register and has one of its inputs connected to the allot 4 signal from the byte allotter circuit 10, and the other input connected to the output of the 23rd position in the data storage buffer shift register 14 through lead A24. The AND gates 202, 203, and 204 have their outputs connected in a similar manner as gate 201, but they are connected to an input of gates 230, 231, and 232 respectively, for loading the NRZ1 register and each has one of its inputs also connected together and then to the allot 4 signal from the byte allotter 10, and the other input of each gate is connected to the output of the 22nd, 21st, and 20th positions respectively, of the data storage buffer 14 through leads A23, A22, and A21. Gates 201 through 204 are controlled by the byte allotter 10 in the 6 byte mode of operation. Similarly, AND gates 209 through 212 and gates 217 through 220 along with previously disclosed AND gates 205 through 208, 213 through 216, and 221 through 224 are controlled by the byte allotter 10 from leads allot 6, allot 8, allot 5, allot 7, and allot 9 respectively, to load the NRZ1 register with the 24 bits contained in the data storage buffer in the 6 byte mode of operation.

OPERATION

Considering now a typical 3 byte write mode of operation, assuming that the system program will issue a select instruction to the magnetic tape unit, commanding it to set itself up for a 3 byte write mode, and to accept four computer words. The magnetic tape unit accepts these four words by clocking them into its data storage buffer four word shift register 14, and starts the transport drive, and switches the power onto the erase and write heads. When the tape has reached the proper writing speed, the basic timing clock in the control function of FIG. 2 is enabled. The first clock pulse steps the byte allotter 10 to enable the allot 1 and allot 5 leads. As a result, gates 233 through 236 and gates 205 through 208 are opened and switch the most significant 8 bits, bits 16 to 23, of the first word to gating level B. Leads A17 through A24 are switched through gating level A to leads A54 through A61. These 8 leads are gated through level B logic and appear on the outputs of gates 225 through 232. On the second clock pulse the outputs of gates 225 through 232 are switched to the non-return to zero change at one register, which allows changes in flux to saturate the magnetic tape as these bits are being written on the tape. On the next clock pulse the byte allotter 10 enables the allot 2 and allot 7 leads to start the sequence again as previously stated. On the fifth clock pulse the byte allotter 10 enables the 8 least significant bits from leads allot 3 and allot 9. This completes the first word in the shift register. Similarly, it writes the second, third and fourth words of the shift register onto magnetic tape. At the end of the third word, the control circuit alerts the program, through an interrupt, that the magnetic tape unit is now ready to receive more data for recording.

When the program recognizes the interrupt, it sends the magnetic tape unit a directive informing it that the transmission of four more words is now imminent. The magnetic tape unit then receives and records the new four words in the data storage buffer 14 as previously stated. A typical 6 byte mode of operation is decoded by the peripheral adapter instruction decode circuit and status bit 8 is set in the status register. The first clock pulse in this mode of operation steps the byte allotter 10 to enable the allot 4 lead, which steps the word out counter. As a result, only gates 201 through 204 are opened to allow bits 20 through 23 on leads A21 through A24 in the data storage buffer shift register to appear on leads A62 through A65 of gating level A. These four leads are gated through level B logic gates 229 through 232, whereas in the typical 3 byte mode of operation leads A21 through A24 were switched to gating level B logic gates 225 through 228. With status bit 8 set and the word out counter not equal to 0, gate 245 is enabled and provides a fill character to gating level B. Thus, the outputs of gates 225 through 228 are set to a value of 1. On the second clock pulse the outputs of gating level B gates 225 through 232 are written on the magnetic tape and also switched to the non-return to zero change at one register, which allows changes in flux to saturate the magnetic tape. On the next clock pulse the byte allotter 10 steps the allot 5 lead and the word out counter. Gating level A logic gates 205 through 208 are opened and leads A17 through A20 from the shift register bits 16 through 19 are switched to leads A54 through A57 as discussed in the typical 3 byte mode of operation. Lead A54 through A57 are switched through the same gating level B logic in either mode of operation. These signals appear on the outputs of gates 229 through 232. Status bit 8 remains set with the word out counter not equal to 0 and thus, gate 245 is enabled to again provide a fill character of value 1 to the outputs of gating level B gates 225 through 228. On the fourth clock pulse the outputs of gates 225 through 232 are written on the magnetic tape and also switched to the nonreturn to zero change at one register (NRZ1). This process continues for the third through the sixth 4 bits of the first data storage buffer shift register word until this word has been written on the magnetic tape. The byte allotter 10 has stepped through enabling leads allot 6 through allot 9 for the remaining four bytes of 4 bits each. Then the second, third and fourth words are written on magnetic tape in a similar manner. If these four words are the last of a block to be written on magnetic tape, the magnetic tape will record the last four words, followed by redundancy check information, and finally the magnetic tape unit disengages the transport drive.

The information is stored on the tape in the Extended Binary Coded Decimal Interchange Code (EBCDIC), and therefore in the 6 byte mode of operation, the 4 fill bits are stored in the four most significant bit positions corresponding to alpha characters which are not used in ticketing applications. In the 3 byte mode of operation, which may be used for dumping system programs, the entire 8 bit character recorded on the tape is in alpha-numeric code.

What is claimed is:

1. In a communication switching system having a switching network for establishing connections selectively between calling and called lines, an arrangement for a system formatted data word for supplying it to a recording apparatus, comprising:

- an output register for transferring portions of the information word to the recording apparatus;
- first gating means for transferring sequentially N number of portions of the word to said output register;
- second gating means for transferring sequentially M number of portions of the word to said output register where said N number is different from said M number; and
- allotting means for causing either said first or said second gates to transfer said word to the recording apparatus.

2. An arrangement according to claim 1, wherein said output register comprises a plurality of latches.

3. An arrangement according to claim 2, wherein said first gating means comprises a plurality of logic gates.

4. An arrangement according to claim 3, wherein said second gating means comprises a pluarlity of logic gates.

5. An arrangement according to claim 4, wherein said allotter means comprises a counter.

* * * * *